US 6,539,499 B1

(12) United States Patent
Stedman et al.

(10) Patent No.: US 6,539,499 B1
(45) Date of Patent: Mar. 25, 2003

(54) GRAPHICAL INTERFACE, METHOD, AND SYSTEM FOR THE PROVISION OF DIAGNOSTIC AND SUPPORT SERVICES IN A COMPUTER SYSTEM

(75) Inventors: Roy William Stedman, Austin, TX (US); Tim William Cox, Austin, TX (US); Sharon Diane Knippa, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/413,599

(22) Filed: Oct. 6, 1999

(51) Int. Cl.[7] ................................................ G06F 11/00
(52) U.S. Cl. ........................... 714/40; 714/46; 345/709; 705/29
(58) Field of Search ............................... 714/40, 26, 32, 714/46, 27; 345/705, 708, 709, 712, 714, 735; 705/29; 706/11, 911

(56) References Cited

U.S. PATENT DOCUMENTS

| | | | | |
|---|---|---|---|---|
| 4,253,178 A | | 2/1981 | Kolaczia | 368/285 |
| 4,356,545 A | * | 10/1982 | West | 379/93.37 |
| 4,438,458 A | | 3/1984 | Munscher | 358/254 |
| 4,491,914 A | | 1/1985 | Sujaku | 364/200 |
| 4,627,060 A | | 12/1986 | Huang et al. | 371/62 |
| 4,635,187 A | | 1/1987 | Baron et al. | 364/200 |
| 4,788,658 A | | 11/1988 | Hanebuth | 364/900 |
| 4,809,280 A | | 2/1989 | Shonaka | 371/62 |
| 4,916,699 A | * | 4/1990 | Ohashi | 345/173 |
| 4,964,077 A | | 10/1990 | Eisen et al. | 364/900 |
| 5,010,551 A | | 4/1991 | Goldsmith et al. | 371/16.4 |
| 5,017,030 A | | 5/1991 | Crews | 400/485 |
| 5,060,135 A | | 10/1991 | Levine et al. | 364/200 |
| 5,196,993 A | | 3/1993 | Herron et al. | 361/393 |
| 5,214,695 A | | 5/1993 | Arnold et al. | 380/4 |
| 5,224,024 A | | 6/1993 | Tu et al. | 364/429 |
| 5,228,655 A | | 7/1993 | Garcia et al. | 248/118 |

(List continued on next page.)

FOREIGN PATENT DOCUMENTS

| | | | | |
|---|---|---|---|---|
| GB | 2065939 | 7/1981 | | G06F/11/30 |
| GB | 2329266 | 3/1999 | | G06F/11/00 |
| GB | 2356271 | 5/2001 | | G06F/11/00 |
| WO | WO 93/00628 | 1/1993 | | G06F/1/24 |
| WO | WO 94/08289 | 4/1994 | | G06F/9/445 |
| WO | WO 97/09676 | 3/1997 | | |
| WO | WO 98/18086 | 4/1998 | | |

OTHER PUBLICATIONS

CNET.com, "IBM to Get Colorful with New Notebooks" at Internet>http://news.cnet.com/news/0-1003-200-296049.html?tag=st.cn.1fd2.<, printed Oct. 6, 1999.

(List continued on next page.)

*Primary Examiner*—Robert Beausoliel
*Assistant Examiner*—Marc Duncan
(74) *Attorney, Agent, or Firm*—Baker Botts L.L.P.

(57) ABSTRACT

A method and system for providing diagnostic services for a computer system is provided. The diagnostic application presents to the user of the computer system a graphical representation of a computer system (202). The user is able to click on graphical components of the graphical representation. The diagnostic application performs diagnostic services on the particular component clicked on by the user. The diagnostic application may determine if the most recent version of the appropriate software driver is installed in the computer system. The diagnostic application may perform diagnostic tests on the clicked component. The diagnostic application may also permit the user to access online diagnostic services to permit the user to access the most recent version of the applicable software driver, communicate with a diagnostic support specialist, or receive additional diagnostic tools from a location remote from the computer system.

5 Claims, 4 Drawing Sheets

U.S. PATENT DOCUMENTS

| | | | |
|---|---|---|---|
| 5,276,805 A | 1/1994 | Hamaguchi | 395/164 |
| 5,287,448 A * | 2/1994 | Nicol et al. | 345/707 |
| 5,287,505 A | 2/1994 | Calvert et al. | 395/600 |
| 5,325,521 A | 6/1994 | Koyama et al. | 375/575 |
| 5,346,410 A | 9/1994 | Moore, Jr. | 439/607 |
| 5,348,408 A | 9/1994 | Gelardi et al. | 400/715 |
| 5,355,357 A | 10/1994 | Yamamori et al. | 369/75.2 |
| 5,356,099 A | 10/1994 | Sereboff | 248/118.1 |
| 5,367,667 A | 11/1994 | Wahlquist et al. | 395/575 |
| 5,374,018 A | 12/1994 | Daneshvar | 248/118 |
| 5,375,800 A | 12/1994 | Wilcox et al. | 248/118 |
| 5,381,526 A | 1/1995 | Ellson | 395/164 |
| 5,388,032 A | 2/1995 | Gill et al. | 364/146 |
| 5,390,324 A | 2/1995 | Burckhartt et al. | 395/575 |
| 5,392,095 A | 2/1995 | Siegel | 355/200 |
| 5,398,333 A | 3/1995 | Schieve et al. | 395/575 |
| 5,410,447 A | 4/1995 | Miyagawa et al. | 361/681 |
| 5,422,751 A | 6/1995 | Lewis et al. | 359/83 |
| 5,423,605 A | 6/1995 | Liu | 312/265.6 |
| 5,432,927 A | 7/1995 | Grote et al. | 395/575 |
| 5,443,237 A | 8/1995 | Stadtmauer | 248/441.1 |
| 5,450,576 A | 9/1995 | Kennedy | 395/650 |
| 5,454,080 A | 9/1995 | Fasig et al. | 395/283 |
| 5,455,933 A | 10/1995 | Schieve et al. | 395/183.03 |
| 5,471,674 A | 11/1995 | Stewart et al. | 395/650 |
| 5,483,437 A | 1/1996 | Tang | 363/146 |
| 5,503,484 A | 4/1996 | Louis | 400/489 |
| 5,513,319 A | 4/1996 | Finch et al. | 395/185.08 |
| 5,522,572 A | 6/1996 | Copeland et al. | 248/118 |
| 5,526,180 A | 6/1996 | Rausnitz | 359/609 |
| 5,530,847 A | 6/1996 | Schieve et al. | 395/183.14 |
| 5,537,585 A | 7/1996 | Blickenstaff et al. | 395/600 |
| 5,537,618 A | 7/1996 | Boulton et al. | 395/161 |
| 5,547,154 A | 8/1996 | Kirchoff et al. | 248/118.3 |
| 5,547,172 A | 8/1996 | Paterson et al. | 312/223.2 |
| 5,564,054 A | 10/1996 | Bramnick et al. | 395/700 |
| 5,592,362 A | 1/1997 | Ohgami et al. | 361/686 |
| 5,596,481 A | 1/1997 | Liu et al. | 361/683 |
| 5,596,482 A | 1/1997 | Horikoshi | 361/683 |
| 5,627,964 A | 5/1997 | Reynolds et al. | 395/183.22 |
| 5,668,992 A | 9/1997 | Hammer et al. | 395/651 |
| 5,678,002 A | 10/1997 | Fawcett et al. | 395/183.01 |
| 5,680,640 A | 10/1997 | Ofek et al. | 395/839 |
| 5,689,253 A | 11/1997 | Hargreaves et al. | 341/22 |
| 5,689,706 A | 11/1997 | Rao et al. | 395/617 |
| 5,694,293 A | 12/1997 | Seto et al. | 361/687 |
| 5,708,776 A | 1/1998 | Kikinis | 395/185.08 |
| 5,708,812 A | 1/1998 | Van Dyke et al. | 395/712 |
| 5,724,224 A | 3/1998 | Howell et al. | 361/680 |
| 5,727,163 A | 3/1998 | Bezos | 395/227 |
| 5,732,268 A | 3/1998 | Bizzarri | 395/652 |
| 5,748,877 A | 5/1998 | Dollahite et al. | 395/183.12 |
| 5,759,644 A | 6/1998 | Stanley | 428/14 |
| 5,768,370 A | 6/1998 | Maatta et al. | 379/433 |
| 5,775,822 A | 7/1998 | Cheng | 400/489 |
| 5,778,372 A | 7/1998 | Cordell et al. | 707/100 |
| 5,790,796 A | 8/1998 | Sadowsky | 395/200.51 |
| 5,796,579 A | 8/1998 | Nakajima et al. | 361/683 |
| 5,797,281 A | 8/1998 | Fox | 63/12 |
| 5,803,416 A | 9/1998 | Hanson et al. | 248/118 |
| 5,805,882 A | 9/1998 | Cooper et al. | 395/652 |
| 5,809,248 A | 9/1998 | Vidovic | 395/200.49 |
| 5,809,511 A | 9/1998 | Peake | 707/204 |
| 5,818,635 A | 10/1998 | Hohn et al. | 359/612 |
| 5,819,274 A | 10/1998 | Jackson, Jr. | 707/10 |
| 5,825,355 A | 10/1998 | Palmer et al. | 345/336 |
| 5,825,506 A | 10/1998 | Bednar et al. | 358/402 |
| 5,826,839 A | 10/1998 | Chen | 248/118 |
| 5,832,522 A | 11/1998 | Blickenstaff et al. | 707/204 |
| 5,835,344 A | 11/1998 | Alexander | 361/683 |
| 5,845,136 A | 12/1998 | Babcock | 395/750.01 |
| 5,852,545 A | 12/1998 | Pan-Ratzlaff | 361/683 |
| 5,854,828 A | 12/1998 | Kocis et al. | 379/93.31 |
| 5,860,001 A | 1/1999 | Cromer et al. | 395/651 |
| 5,860,002 A | 1/1999 | Huang | 395/652 |
| 5,860,012 A | 1/1999 | Luu | 395/712 |
| 5,861,884 A | 1/1999 | Fujioka | 345/338 |
| 5,881,236 A | 3/1999 | Dickey | 395/200.51 |
| 5,884,073 A | 3/1999 | Dent | 395/652 |
| 5,894,571 A | 4/1999 | O'Connor | 395/692 |
| 5,904,327 A | 5/1999 | Cheng | 248/118.1 |
| 5,905,632 A | 5/1999 | Seto et al. | 361/683 |
| 5,906,506 A | 5/1999 | Chang et al. | 439/500 |
| 5,909,544 A | 6/1999 | Anderson, II et al. | 395/200.38 |
| 5,939,694 A | 8/1999 | Holcomb et al. | 235/381 |
| 5,953,533 A | 9/1999 | Fink et al. | 395/712 |
| 5,955,797 A | 9/1999 | Kim | 307/150 |
| 5,960,189 A * | 9/1999 | Stupek et al. | 703/21 |
| 5,960,204 A | 9/1999 | Yinger et al. | 395/712 |
| 5,960,411 A | 9/1999 | Hartman et al. | 705/26 |
| 5,963,743 A | 10/1999 | Amberg et al. | 395/712 |
| 5,974,546 A | 10/1999 | Anderson | 713/2 |
| 5,978,911 A | 11/1999 | Knox et al. | 713/1 |
| 5,983,369 A * | 11/1999 | Bakoglu et al. | 714/25 |
| 5,991,543 A | 11/1999 | Amberg et al. | 395/712 |
| 5,995,757 A | 11/1999 | Amberg et al. | 395/712 |
| 6,006,344 A | 12/1999 | Bell, Jr. | 714/37 |
| 6,012,154 A | 1/2000 | Poisner | 714/55 |
| 6,014,744 A | 1/2000 | McKaughan et al. | 713/2 |
| 6,023,267 A * | 2/2000 | Chapuis et al. | 345/712 |
| 6,029,257 A * | 2/2000 | Palmer | 714/25 |
| 6,029,258 A * | 2/2000 | Ahmad | 714/26 |
| 6,032,157 A | 2/2000 | Tamano et al. | 707/104 |
| 6,034,869 A | 3/2000 | Lin | 361/686 |
| 6,038,597 A | 3/2000 | Van Wyngarden | 709/219 |
| 6,047,261 A | 4/2000 | Siefert | 705/11 |
| 6,048,454 A | 4/2000 | Howell et al. | 361/686 |
| 6,049,342 A | 4/2000 | Nielson et al. | 345/473 |
| 6,050,833 A | 4/2000 | Danzyger et al. | 439/92 |
| 6,056,136 A * | 5/2000 | Taber et al. | 215/252 |
| 6,061,788 A | 5/2000 | Reynaud et al. | 713/2 |
| 6,061,810 A | 5/2000 | Potter | 714/23 |
| 6,108,697 A | 8/2000 | Raymond et al. | 709/218 |
| 6,112,320 A | 8/2000 | Dien | 714/51 |
| 6,113,050 A | 9/2000 | Rush | 248/346.01 |
| 6,166,729 A | 12/2000 | Acosta et al. | 345/327 |
| 6,167,383 A | 12/2000 | Henson | 705/26 |
| 6,167,532 A | 12/2000 | Wisecup | 714/23 |
| 6,170,065 B1 * | 1/2001 | Kobata et al. | 714/38 |
| 6,182,212 B1 | 1/2001 | Atkins et al. | 713/1 |
| 6,182,275 B1 | 1/2001 | Beelitz et al. | 717/1 |
| 6,199,204 B1 | 3/2001 | Donohue | 717/11 |
| 6,202,207 B1 | 3/2001 | Donohue | 717/11 |
| 6,226,412 B1 | 5/2001 | Schwab | 382/232 |
| 6,236,901 B1 | 5/2001 | Goss | 700/95 |
| 6,247,126 B1 | 6/2001 | Beelitz et al. | 713/1 |
| 6,256,620 B1 | 7/2001 | Jawahar et al. | 707/2 |
| 6,263,215 B1 | 7/2001 | Patton et al. | 455/561 |
| 6,272,484 B1 | 8/2001 | Martin et al. | 707/1 |
| 6,279,125 B1 * | 8/2001 | Klein | 714/38 |
| 6,279,156 B1 | 8/2001 | Amberg et al. | 717/11 |
| 6,298,457 B1 * | 10/2001 | Rachlin et al. | 714/12 |
| 6,331,936 B1 | 12/2001 | Hom et al. | 361/686 |
| 6,356,977 B2 | 3/2002 | Ofek et al. | 711/112 |
| 6,367,035 B1 * | 4/2002 | White | 379/2 |
| 6,385,737 B1 | 5/2002 | Benignus et al. | 714/22 |
| 6,393,586 B1 | 5/2002 | Sloan et al. | 714/25 |

OTHER PUBLICATIONS

3Com, "Palm Computer, News and Promotions" at Internet >http://www.palm.com/pr/holidaydebut.html<, printed Oct. 5, 1999.

@Backup Company, "@Backup Company Information Page" at Internet, http://security.atbackup.com/VID101.3.819255.0/Company.htm, printed Jun. 15, 1999.

@Backup Company, "@Backup Company Frequently Asked Questions" at Internet, http://security.atbackup.com/VID101.3.819255.0/FAQ.asp, printed Jun. 15, 1999.

@Backup Company, "Frequently Asked Questions: Technical" at Internet, http://security.atbackup.com/VID101.3.819255.0/Tech.asp, printed Jun. 15, 1999.

@Backup Company, "Are You Protected" at Internet, http://security.atbackup.com/VID101.3.819255.0/Main.asp, printed Jun. 15, 1999.

Exploring Windows NT "ZD Journals" at Internet >http://www.zdjournals.com/9802.ewn9821.html<, printed Oct. 18, 1999.

PCWorld News "Compaq Debuts Home PCs" at Internet >http://www2.pcworld.com.html<, printed Oct. 18, 1999.

"HP builds in Net button," at Internet <http://news.cnet.com/news/0–1003–202–316545.html>, printed Oct. 18, 1999.

"Packard Bell PCs provide state-of-the-art technology and complete user support" at <http://www.gadgetguru.com.html>, printed Oct. 18, 1999.

Written Opinion for Singapore Application No. 200004380–2, mailed Feb. 8, 2002.

Compaq Computer Corporation, Press Release, "New PCs Offer Equipment, Colour and Personality; Compaq's Presario Range Opened Up for Customisation" at Internet >http://biz.yahoo.com/prnews/000719/compaq_new.html<, printed Jul. 24, 2000.

Compaq Computer Corporation, "Home and Home Office Computing, My Style" at internet >wysiwyg://3/http://athome.compaq.com/showroom/static/splash.asp<, printed Jul. 18, 2000.

Epson, "Epson Stylus Color 74i It makes a Colorful Case for Being Your iMac Printer" at Internet >http://www.epson.com/printer/inkjet/sty740i.html<, printed Jul. 24, 2000.

Radio Shack, advertisement, p. 2, Aug. 20, 2000.

Pending patent application Ser. No. 09/236,862: Alan E. Beelitz, Richard D. Amberg; "Recoverable Software Installation Process and Apparatus for a Computer System"; Dell USA, L.P., Filed Dec. 15, 1999.

Pending patent application 09/245,148: Jeffrey N. Sloan, Tim Sullivan, David S. Springer, *"Method and Apparatus for Diagnosing and Conveying an Identification Code in Post on a Non–Booting Personal Computer"*; Dell USA, L.P., Filed Feb. 4, 1999.

* cited by examiner

GRAPHICAL INTERFACE, METHOD, AND SYSTEM FOR THE PROVISION OF DIAGNOSTIC AND SUPPORT SERVICES IN A COMPUTER SYSTEM

TECHNICAL FIELD OF THE INVENTION

The present invention relates in general to computer systems, and, more particularly, to a graphical interface, method, and system for the provision of diagnostic services in a computer system.

BACKGROUND OF THE INVENTION

With the proliferation of home and business computers, the provision of timely and efficient diagnostic, support, and maintenance services to computer users has become a critical issue for manufacturers and sellers of computer systems. It is not uncommon for computer users, especially new users of computer systems, or experienced users attempting to add or reconfigure existing computer systems, to experience difficulties with their computer systems. It is not uncommon for computer systems to freeze or hang. In other cases, a peripheral of the computer system, such as a hard drive, disk drive, or printer, may not function properly. In other cases, the computer system may not recognize the peripheral. The solution to these sorts of problems may range from simply turning on power to the affected peripheral, reconnecting the affected peripheral, reconfiguring the computer system hardware or software, or installing a necessary software patch for the affected peripheral.

To diagnose and correct a computer system problem, computer users typically have had to consult user's manuals that were included with the purchase of the computer system or peripheral. These manuals typically include troubleshooting tables or guides that attempt to diagnose a user's problem on the basis of symptoms recognized by the user. The effectiveness of the user's manual in assisting the users in identifying and correcting the problems encountered depends in large part on the skill of the computer user and the clarity and completeness of the user's manual. An inexperienced computer user may have difficulty in locating the source of the problem and in following the often confusing instructions in the user's manual. Moreover, user's manuals are often deficient in that they do not address every difficulty encountered by the user.

As an alternative or in addition to consulting a user's manual, a user experiencing difficulty with a computer system may consult diagnostic and support software stored locally on the computer system. The effectiveness of locally stored diagnostic software is limited in that the software programs generally display text files that have information similar to that found in user's manuals. As a result, computer users attempting to diagnose computer system problems through locally stored software programs face limitations similar to those faced by users attempting to diagnose computer system problems through a user's manual.

As another alternative, personal computer users may have access to a computer support or help line. A computer support or help line requires that the user contact a computer support specialist at a central site. The computer support specialist will listen to the user's symptoms and attempt to diagnose the problem. This process often involves the computer support specialist stepping the user through a series of diagnostic tests. If appropriate, the computer support specialist may provide the user with instructions or tips for correcting the problem. The effectiveness of interpersonal diagnostic and support services of this sort depends in large part on the skill of the computer user being assisted. Regardless of the skill and knowledge of the computer support specialist, the computer user will nevertheless have to describe correctly the problem being experienced, assist the computer support specialist in diagnosing the problem, and perform the fix or correction suggested by the computer support specialist.

Another drawback of computer support lines is that they are often overused. Computer users that are experiencing trivial or easily correctable problems will contact a computer specialist to resolve the problem. Often the problems are relatively simple and are sometimes corrected by simply applying power to the computer or affected peripheral. Calls regarding such easily correctable problems to the computer support help line unnecessarily clog the phone lines with problems that could be corrected locally.

SUMMARY OF THE INVENTION

In view of the difficulties of known diagnosis and support systems for computer users, a need has arisen for a system that provides a method and system for providing diagnostic services to computer users that involves the use of a clickable, graphical representation of a computer system. When a user seeks diagnostic and support services from the computer systems, the method and system of the present invention displays for the user a graphical representation of a computer system. The user may click a component of the computer system that is represented by a graphical component of the graphical representation of the computer system. Once the user identifies the component of the computer system that is experiencing problems, the method and system of the present inventions performs diagnostic services on the clicked component. The diagnostic services may include an analysis of the software driver of the clicked component and the diagnostic testing of the clicked component. The diagnostic program of the present invention may also access online support services to permit the user to access the most recent update of the software driver for the clicked component or to permit the user to communicate with a diagnostic support specialist, who may direct the downloading of diagnostic tools or the execution of diagnostic tools from a location remote from the computer system.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1A:
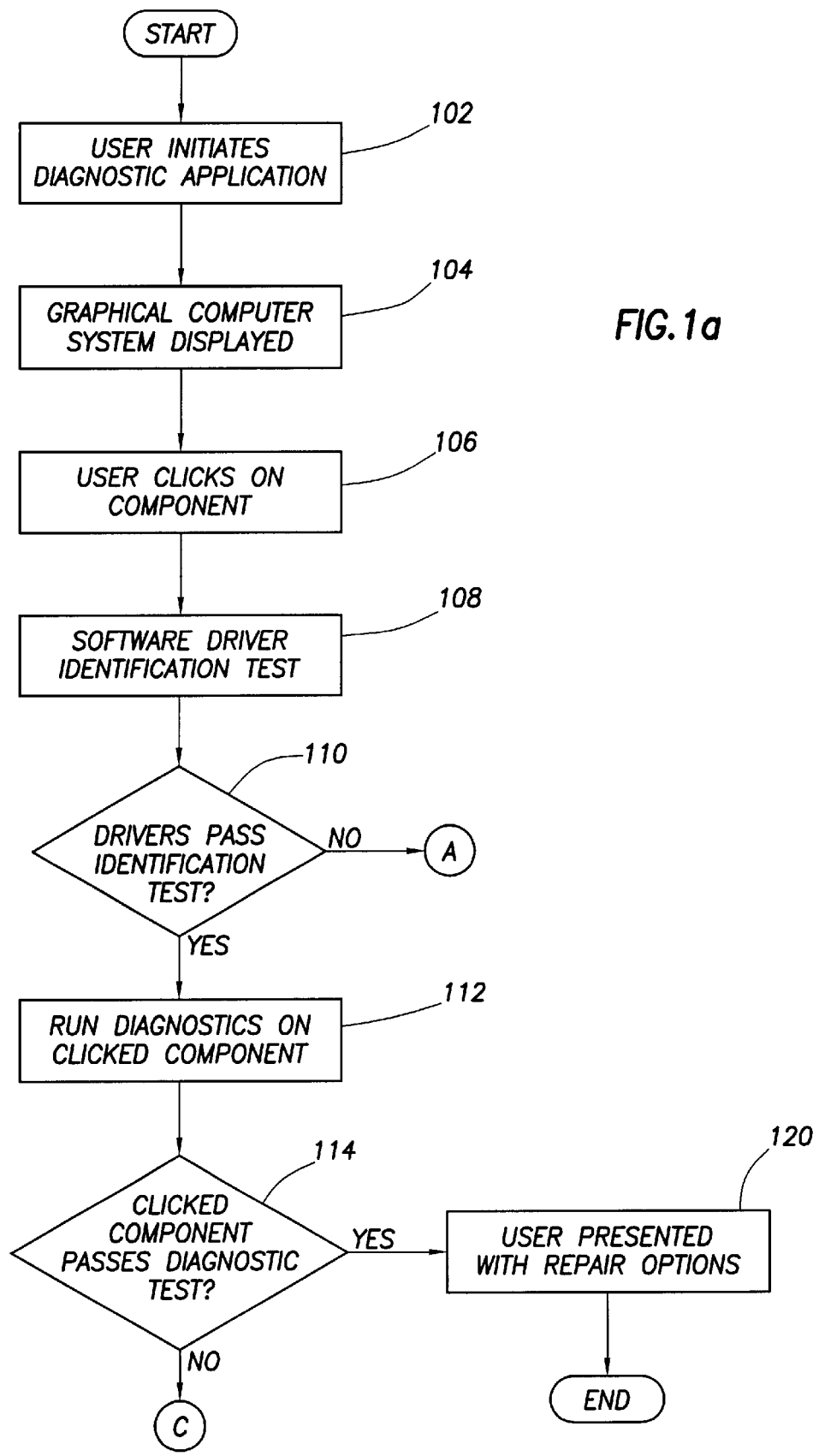
FIG. 1a, FIG. 1b, and FIG. 1c are flow diagrams of the diagnostic and support system described herein.

When a computer user is experiencing difficulty with a computer system, the computer user can initiate a diagnostic and support system by initiating a software application that resides on the computer system or is accessible to the computer system through a network connection. FIG. 1a and following figures are a flow diagram of the steps the diagnostic and support system described herein. In step 102 of FIG. 1a, the computer user initiates the diagnostic application. In one embodiment of the diagnostic and support system, the diagnostic application resides on user's desktop. In this manner, the diagnostic application is visible and readily accessible by the user at all times. The user may also initiate the diagnostic application by pressing a service button. The service button is a physical button on housing of the computer system. The service button is visible and easily accessible to the user, providing to the user a visible and readily accessible means of accessing the diagnostic application.

As an alternative to having the diagnostic application reside locally on the computer system, the diagnostic program may be stored on a network that may be accessed by the user. One example of a network that may be easily accessed by a user would include a diagnostic web site that is maintained by the computer manufacturer. In such a case, when the icon representing the diagnostic application is double-clicked or set to run, a program stored locally on the computer system initiates the user's Internet service provider and attempts to log the user onto the web site where the diagnostic application is maintained. Once the user reaches the computer manufacturer's diagnostic web site, the user may initiate the diagnostic application.

Figure 2:
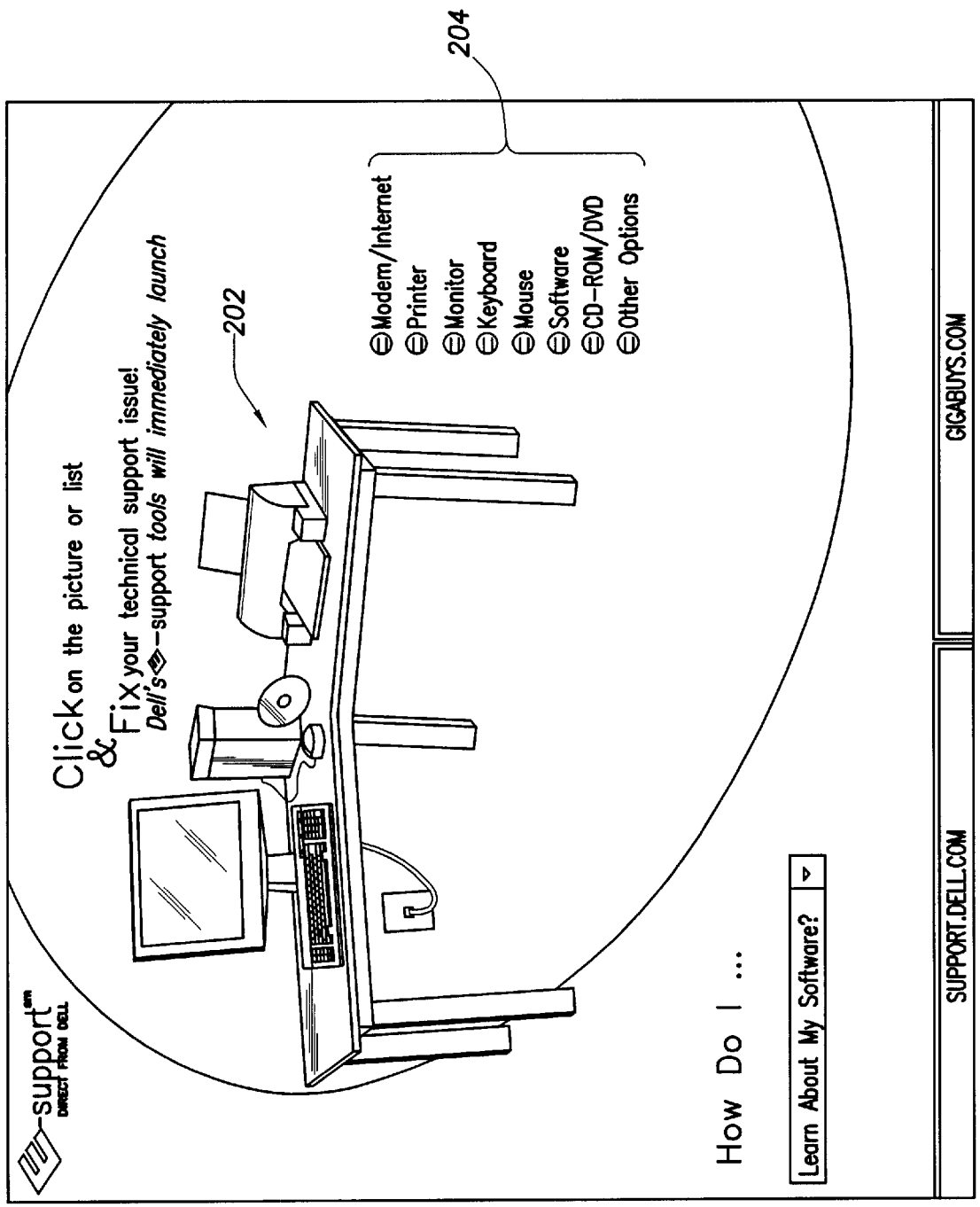
FIG. 2 is a depiction of a clickable graphical representation of a computer system.

At step 104, after the diagnostic application has been initiated, a graphical representation of a computer system is displayed. A sample of the graphical representation of the computer system is shown at 202 in FIG. 2. The user is instructed to click on the component that needs to be addressed by the diagnostic application. The graphical representation 202 of FIG. 2 depicts a computer system having a modem and Internet connection, printer, monitor, keyboard, mouse, CD-ROM, and DVD player. Graphical representation 202 also depicts the console of the computer system, which houses the CPU, memory, and hard drive of the computer system. The graphical representation of the computer system may be changed to include other components not shown on the graphical representation 202, including Universal Serial Bus connections, scanners, digital cameras, or other components.

In presenting the graphical representation 202 of the user's computer system, the diagnostic application may display a representative computer system that includes the types of components that are standard on a computer system, i.e., without reference to the particular components of the user's computer system. Alternatively, the diagnostic application may search a directory of components of the computer system and display the components that are currently installed on the user's computer system. Additionally, the user may be prompted to add or remove components from the graphical representation shown to better reflect the user's understanding of components installed or thought to be installed on the computer system.

The graphical representation 202 of the user's computer system is comprised of multiple clickable graphical elements, such as the modem and Internet connection, printer, monitor, keyboard, mouse, CD-ROM, and DVD player. At step 106, the user is instructed by the diagnostic application to click on the component of the graphical representation that is experiencing trouble. As such, if the user is experiencing trouble with the DVD player, the user clicks on the DVD player in the graphical representation 202 of the user's computer system. FIG. 2 also depicts a clickable listing of the components of the computer system. As an alternative to clicking on the graphical representation of the computer system, the user may click on the name of the component in the list of components at 204 to indicate the component that is experiencing difficulty.

After the user has clicked on the troubled component at step 106, the diagnostic application performs an identification test on the drivers for the clicked component at step 108. As part of the driver identification test, the diagnostic application determines whether the software driver for the clicked component is correctly installed in the computer system. In some instances, the software driver may not be found in the computer system or the software driver may be incorrectly or incompletely installed in the computer system.

As part of the driver identification test, the diagnostic application also determines if the software driver installed in the computer system is the most current software driver for the computer system. To accomplish this element of the driver identification test, the diagnostic application accesses the Internet via the computer user's web browser and Internet service provider. Once the user gains access to the Internet, the diagnostic application accesses a database and web site maintained by the computer manufacturer that identifies the most recent software driver for a particular hardware component or peripheral of the computer system. Recent software drivers may contain bug fixes that will correct the problem being experienced by the user.

At step 110, it is determined whether the software drivers have passed the driver identification test of step 108, i.e., whether the most recent version of the software driver for the clicked component is correctly installed. If software drivers for the clicked component pass the identification test, the diagnostic application runs a component-specific diagnostic tool on the clicked component at step 112. The component-specific diagnostic tool of the diagnostic application will perform a series of tests to evaluate whether the component is operating correctly. The component-specific diagnostic tool may be stored locally on the computer system as part of the diagnostic application. Alternatively, the component-specific diagnostic tool may be stored remotely on a network that is accessible via an Internet connection. According to this alternative, the diagnostic application may retrieve the component-specific diagnostic tool by accessing the Internet through the user's web browser and Internet service provider. When the component-specific diagnostic tool is maintained on a remote network, the diagnostic tool may be updated to account for changes in software drivers for the clicked component. Component-specific diagnostic tools that are stored remotely from the diagnostic application may be updated to reflect the most recent understanding of the operation of the user's computer system or the operation of the clicked component. The component-specific diagnostic tool of the diagnostic application will perform a series of tests to evaluate whether the component is operating correctly.

The diagnostic application is also capable of combining multiple component-specific diagnostic tests to evaluate more thoroughly the performance of a clicked component or related components. As an example, a computer system may include a Universal Serial Bus that is coupled to a printer. If the user is experiencing difficulties with the printer, the user may click on the graphical representation of the printer. The diagnostic application will run a component-specific diagnostic test on both the printer and the Universal Serial Bus. The diagnostic application may also run a component-specific diagnostic test that is directed specifically to the connection of a Universal Serial Bus to a printer. In this manner, the diagnostic application may run a diagnostic test on more than one component and on the interconnection between discrete components. Thus, with a single click of the mouse by the user, the diagnostic application can evaluate the clicked component, components integrated with or connected to the clicked component, and the interconnection of the integrated components. If the cause of the problem experienced by the user is the Universal Serial Bus, the diagnostic application will locate the problem even though the user clicked on the printer rather than the Universal Serial Bus. Thus, the diagnostic application is able to test aspects of the computer system that cannot be easily tested by a relatively unsophisticated user.

Figure 1C:
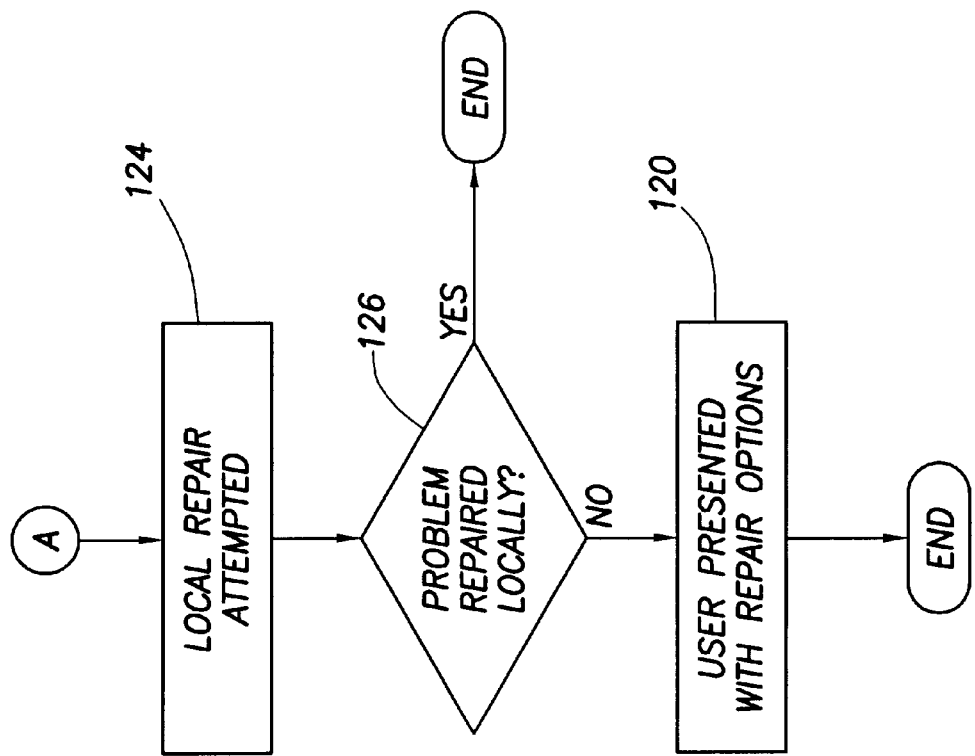
Figure 1B:
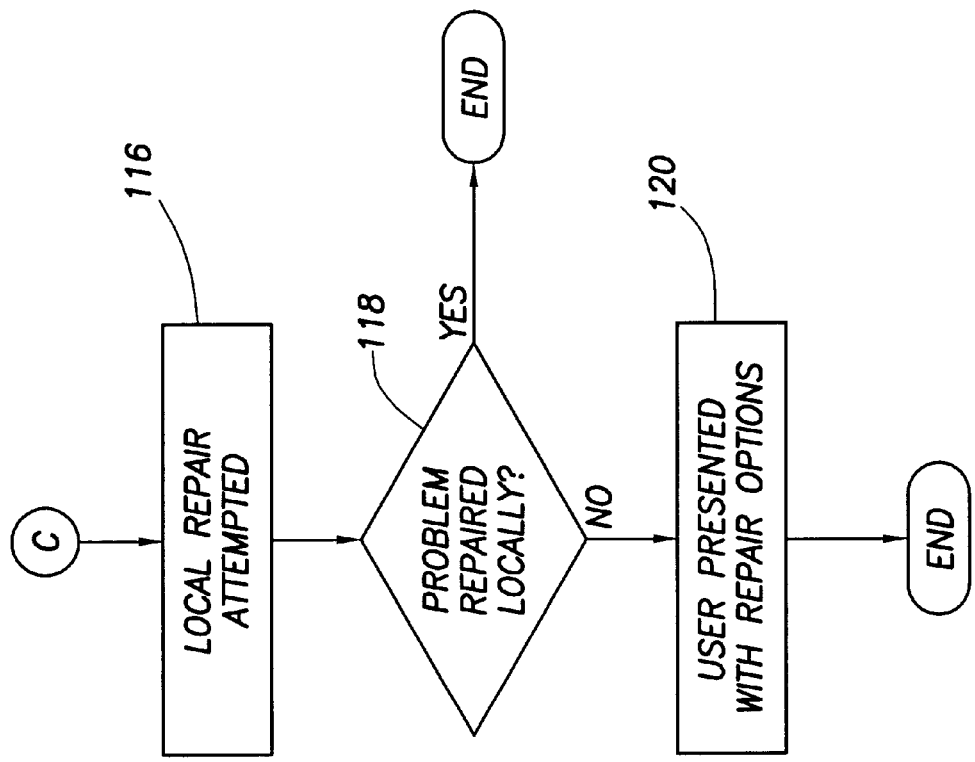

At step 114, it is determined whether all tested components passed the diagnostic test. If a tested component did not pass the diagnostic test, the diagnostic application attempts to repair the failed component locally at step 116 of FIG. 1b. The repair attempt by the diagnostic application may consist of reinstalling a software driver or resetting a failed component. The diagnostic application may also present the user with options for performing a local repair of the problem being experienced by the user. If the diagnostic application is unable to repair the problem locally, the steps suggested to the user may include recycling the software drivers for the failed component, powering off and on the failed component, or rebooting the computer system. Following the local repair attempt, it is determined at step 118 whether the local repair attempt was successful. The diagnostic application may query the user to determine whether the clicked component is operating correctly or to verify that the clicked component has been repaired.

If the foregoing steps do not repair the problem locally, the user is presented at step 120 with a series of diagnostic options for diagnosing and repairing the problem experienced by the clicked component. First, the user is presented with a series of frequently asked diagnostic questions regarding the operation of the clicked component. The user is also presented with the option of accessing a more detailed technical description of the operation of the clicked component. The technical details are presented in the form of text screens that describe the component and the diagnostic tests performed on the component.

As another repair option at step 120, the user is presented with online diagnostic options. The online diagnostic options of step 120 require an Internet connection. If the user chooses to access the options, a diagnostic web site is accessed through the user's browser and Internet service provider. One Internet service option involves the user accessing a diagnostic web site maintained by the computer manufacturer. The user is able to enter a question or key words in a dialog box on the web site. A search is then performed of archived pages that most closely match the question or key words identified by the user. These archived pages may include updates on the operation of the clicked component and components commonly coupled to or integrated with the clicked component. The archived pages may also include archived pages displaying general diagnostic operation on the computer system or the clicked component. According to this online diagnostic option, the user can access, through the computer manufacturer's diagnostic web site, the most recent updates and other archived pages regarding the operation of the clicked component.

Figure 3:
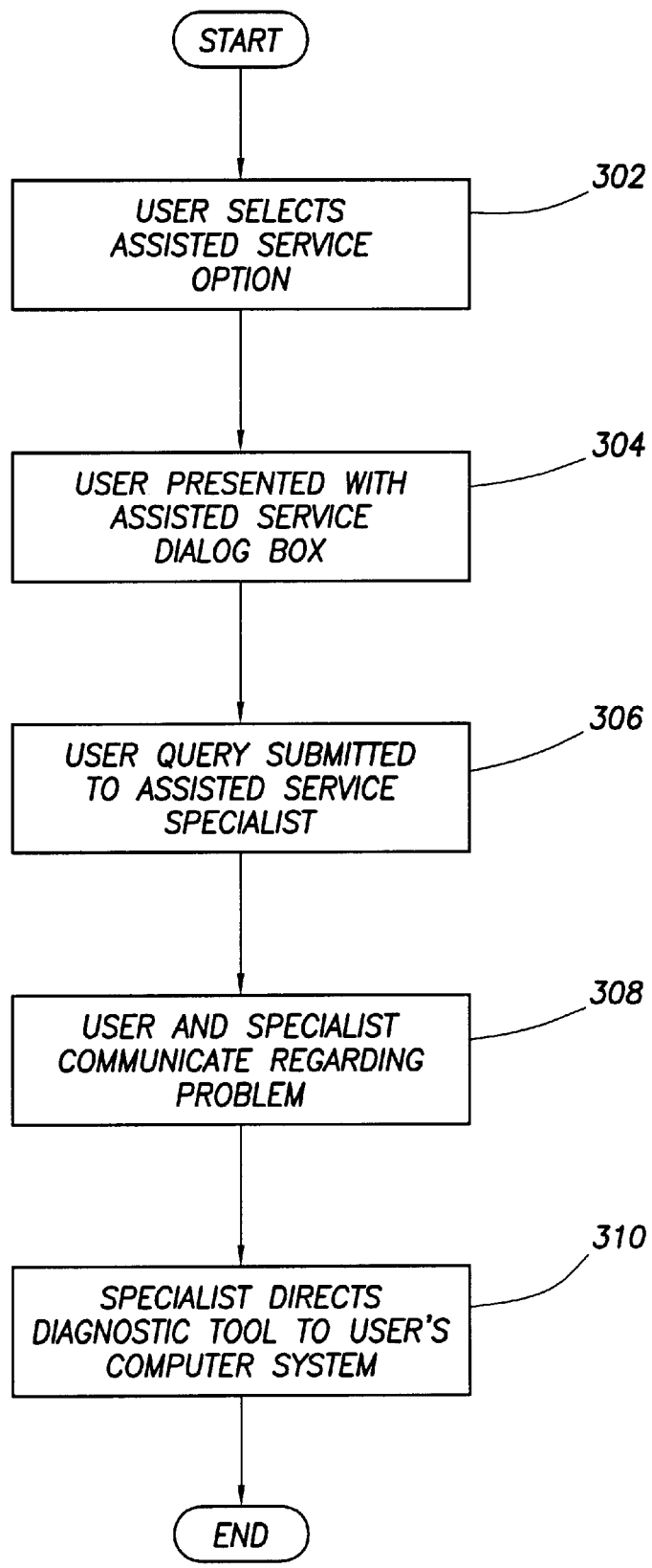
FIG. 3 is a flow diagram of online diagnostic services.

Another online diagnostic option provided to the user is the assisted service option. A flow diagram of the assisted service option is shown in FIG. 3. At step 302, the user initiates the assisted service option from the diagnostic application. At step 304, the user is presented with a dialog box for typing a query or other information to be submitted to an assisted service specialist. After the user enters the query, the query is submitted at step 306 to an assisted service specialist. Once the user enters the query, the diagnostic application will package the query as an electronic transmission to the computer manufacturer's support specialists. The user will be prompted to initiate the computer system's Internet connection or the diagnostic application will automatically access the Internet over the computer system's Internet service provider. The query is transmitted over the Internet in the same manner as an electronic mail transmission. Along with the query, the transmission may contain the computer system's serial or unique identification number, model number, and a listing of the hardware and software components installed on the computer system. The transmission will also contain a history record of the components clicked by the user and the diagnostic tools initiated by the user. Once the query reaches the computer manufacturer's assisted service specialists, the query is routed among the assisted service specialist to a specialist who has experience with the component experiencing the problem or with the type of computer system that is experiencing the problem. To take advantage of the assisted service tool of FIG. 3, the user must have an Internet connection.

Once the assisted service specialist receives the user's query, the assisted service representative provides written advice at step 308 to the user to resolve the user's problem with the computer system and the clicked component. The assisted service specialist's written comments to the user are also transmitted by electronic mail to the user. The electronic transmission from the assisted service specialist is displayed to the user by the diagnostic application or forwarded to the user's electronic mail inbox. The user and assisted service specialist may continue to exchange written comments and questions until the user resolves the problem with the assistance of the assisted service specialist. The assisted service specialist may also direct the user to archived web pages describing the user's problems and options for correcting the problem. As an alternative, the assisted service specialist may give the user his or her telephone number and extension so that the user and specialist can speak by telephone regarding the problem experienced by the user.

The assisted service specialist is also able to direct that a component-specific diagnostic tool be run on the user's computer. By communicating with the user, the assisted service specialist may be able to better identify the source of the problem being experienced by the user. For example, if the assisted service specialist can detect from the user's comments that the fault may exist in the Universal Serial Bus, the assisted service specialist may remotely run a diagnostic application that will attempt to identify and repair the Universal Serial Bus. The component-specific diagnostic tool selected by the assisted service specialist may reside and execute from a location that is remote from the personal computer system under diagnosis. As an alternative, the component-specific diagnostic tool selected by the assisted service specialist may be downloaded at the direction of the assisted service specialist from the assisted service web site to the computer system under diagnosis. Once downloaded, the diagnostic tool may execute from the computer system under diagnosis. The assisted service specialist may have access to diagnostic tools and applications that do not exist in the diagnostic application that resides locally in the computer system of the user. Because of the ability of the assisted service specialist to transmit diagnostic tools from a remote location, the specialist has much greater flexibility in identifying the problem being suffered by the user's computer system and correcting the problem. In this manner, the diagnostic application that resides on the user's computer system is supplemented by diagnostic tools that may be accessed by an assisted service specialist for diagnosing and correcting problems experienced on the user's computer system.

Returning to step 114 of FIG. 1*a*, if the clicked component passes the component-specific diagnostic test, the user is presented with the series of diagnostic options of step 120 discussed above, including the presentation of frequently asked questions, detailed technical discussion, and online assistance options. The frequently asked questions may be tailored to reflect that the clicked component has passed both the software driver identification test of step 110 and the clicked component test of step 114.

At step 110 of FIG. 1*a*, the diagnostic application determined whether the software driver identification test was successful for the clicked component. If the software driver identification test failed, the diagnostic application, at step 124 of FIG. 1*c*, attempts to perform a local repair of the deficient software. The software identification test may fail for several reasons. For example, the necessary software driver may not be found on the user's computer system or the software driver may be incorrectly installed or incompletely installed. The local repair attempt by the diagnostic application may involve the automatic reinstallation of the software driver and the rebooting of the computer system. At step 126, it is determined whether the local repair attempt corrected the problem experienced by the user. As an option, the diagnostic application may ask the user to verify that the problem being experienced by the user has been repaired. If the diagnostic application does not correct the problem experienced by the user locally, the user is presented with the series of diagnostic options of step 120 discussed above, including the presentation of frequently asked questions, detailed technical discussion, and online assistance options.

The diagnostic application of the present invention is one that allows the user to access diagnostic support options by clicking on a graphical representation of a computer system. In this manner, the user is able to direct a detailed, comprehensive diagnostic application through a user-friendly interface. The graphical interface presented by the diagnostic application is novel in that it allows the user to plainly identify the component experienced difficulty. The user is able to initiate a diagnostic application with the tool that may be familiar to the user. The diagnostic application then proceeds to perform diagnostic tasks on the component identified by the user. The diagnostic application is particularly effective for less sophisticated users, who are able to identify a component by clicking a mouse, but are less comfortable in troubleshooting computer problems by reading and digesting sometimes detailed and confusing troubleshooting guides in user's manuals or computer-generated text files.

Although the present invention has been described in detail, it should be understood that various changes, substitutions, and alterations can be made thereto without departing from the spirit and scope of the invention as defined by the appended claims.

What is claimed is:

1. A method for performing diagnostic services on a computer system, comprising the steps of:

identifying the components of the computer system;

presenting for the computer user a graphical representation of the components identified as being components of the computer system;

presenting to the user the option of adding or deleting components from the graphical representation of the computer system;

receiving from the user an input in the form of a mouse click that identifies the component of the computer system that requires diagnostic services; and performing diagnostics services on the component identified by the user.

2. A method for providing diagnostic and repair services to a computer system of a computer user through an online connection to a remote diagnostic specialist, comprising the steps of:

receiving through an online connection at the remote location of the remote diagnostic specialist an electronic message from the computer user, the electronic message including a history record of local diagnostic tools accessed by the computer user, wherein the history record of local diagnostic tools accessed by the computer user includes a record of the graphical components of a graphical representation of the computer system that have been identified by the user during execution of a local diagnostic application;

receiving through an online connection at the location of the computer system a diagnostic tool from the remote diagnostic specialist; and executing the diagnostic tool at the location of the computer user.

3. The method providing diagnostic and repair services of claim 2, wherein the graphical components of the graphical representation of the computer system were identified by the user by a mouse click.

4. A method for providing diagnostic and repair services to a computer system of a computer user through an online connection to a remote diagnostic specialist, comprising the steps of:

receiving through an online connection at the remote location of the remote diagnostic specialist an electronic message from the computer user, the electronic message including a history record of local diagnostic tools accessed by the computer user, wherein the history record of local diagnostic tools accessed by the computer user includes a record of the graphical components of a graphical representation of the computer system that have been identified by the user during execution of a local diagnostic application; and running at a location remote from the computer system a diagnostic tool to provide diagnostic services to the computer system, the diagnostic tool transmitting and receiving data from the computer system through an online connection.

5. The method providing diagnostic and repair services of claim 4, wherein the graphical components of the graphical representation of the computer system were identified by the user by a mouse click.

* * * * *